(12) United States Patent
Wu et al.

(10) Patent No.: US 7,309,386 B2
(45) Date of Patent: Dec. 18, 2007

(54) VERTICAL AIR CLEANER

(75) Inventors: Guolian Wu, St. Joseph, MI (US); Andrew D. Litch, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 386 days.

(21) Appl. No.: 11/025,309

(22) Filed: Dec. 29, 2004

(65) Prior Publication Data
US 2006/0053758 A1    Mar. 16, 2006

Related U.S. Application Data

(60) Provisional application No. 60/522,292, filed on Sep. 13, 2004.

(51) Int. Cl.
*B01C 3/00* (2006.01)
*B01D 46/00* (2006.01)

(52) U.S. Cl. .............................. 96/70; 55/472; 55/471; 96/78; 96/79

(58) Field of Classification Search ............... 55/471, 55/472; 95/79; 96/15, 70, 75, 78, 79, 84, 96/87
See application file for complete search history.

(56) References Cited

U.S. PATENT DOCUMENTS

| | | | |
|---|---|---|---|
| 5,833,727 A * | 11/1998 | Skarsten | 55/385.2 |
| 6,176,977 B1 * | 1/2001 | Taylor et al. | 204/176 |
| 6,322,614 B1 * | 11/2001 | Tillmans | 96/16 |
| 6,350,417 B1 * | 2/2002 | Lau et al. | 422/186.04 |
| 6,713,026 B2 * | 3/2004 | Taylor et al. | 422/186.04 |
| 6,899,745 B2 * | 5/2005 | Gatchell et al. | 95/76 |
| 6,926,762 B2 * | 8/2005 | Kim et al. | 96/397 |
| 6,929,684 B2 * | 8/2005 | Chang et al. | 96/226 |
| 6,953,556 B2 * | 10/2005 | Taylor et al. | 422/186.04 |
| 7,014,686 B2 * | 3/2006 | Gatchell et al. | 96/51 |
| 7,153,347 B2 * | 12/2006 | Kang et al. | 96/422 |
| 7,163,572 B1 * | 1/2007 | Liang et al. | 96/63 |

FOREIGN PATENT DOCUMENTS

JP    2002079022    *    3/2002

* cited by examiner

*Primary Examiner*—Duane Smith
*Assistant Examiner*—Sonji Turner
(74) *Attorney, Agent, or Firm*—Michael D. Lafrenz; Thomas A. Schwyn

(57) ABSTRACT

A portable air cleaner having a vertical orientation with a small footprint that uses an electrostatic precipitator to remove small particles from the air in combination with forced air for increased air flow and improved particle removal.

21 Claims, 17 Drawing Sheets

VERTICAL AIR CLEANER

CROSS-REFERENCE TO RELATED APPLICATION

This application claims the benefit of U.S. provisional application Ser. No. 60/522,292, filed Sep. 13, 2004, which is incorporated herein by reference in its entirety.

BACKGROUND OF THE INVENTION

1. Field of the Invention

The invention relates generally to air cleaners for removing impurities from the ambient air, and more particularly to a vertically-oriented air cleaner having a small footprint and improved air flow.

2. Description of the Related Art

Portable or room air cleaners are a common consumer product for use in the home and office. Their popularity continues to increase. The portable nature of the air cleaners necessarily requires them to be placed in the room, where they will be visible.

Contemporary air cleaners have a relative squat profile that creates a relatively large footprint. They also tend to control the air flow by using an axial air flow that draws air through the front of the air cleaner and directs it out the back, with the controls placed on the front. Such a configuration typically results in the air cleaner consuming a relative large amount of floor space for operation. First, the squat nature of the air cleaner has a large footprint given its total volume. Second, the axial flow normally requires the air cleaner to be spaced from a wall to function properly; otherwise the close proximity of the wall might impede the air flow by creating an unexpected pressure increase.

Therefore, there is a need for an air cleaner that consumes less room area. However, consumers still require that the air cleaner perform. The current designs make it difficult to simultaneously have the desired air cleaning and reducing the area of the room used by the air cleaner.

SUMMARY OF THE INVENTION

An expandable capacity air cleaner comprises a housing having an inlet and an outlet and defining an air flow path from the inlet to the outlet, a blower located within the air flow path and operable to draw air into the inlet and expel air through the outlet, and an air cleaning element located within the air flow path and comprising at least one air cleaning module, wherein the clean air delivery rate of the air cleaner can be selected by selection of the number of air cleaning modules comprising the air cleaning element. The air cleaning element can comprise multiple air cleaning modules wherein each of the multiple air cleaning modules provides the same clean air delivery rate.

The blower can comprise at least one blower module, and the blower module and the air cleaning module can be matched in at least one of size and capacity. The blower module can be a crossflow blower having an axis of rotation that is vertically oriented within the air flow path.

The housing can have an elongated configuration, and can comprise a base for supporting the elongated housing in a vertical orientation. The height of the elongated housing can be increased in proportion to the number of air cleaning modules. The base can be independent of the height of the elongated housing, and the size of the base can be constant. The air cleaning module comprises at least one ionizer, and at least one precipitator plate.

The ionizer can be located in the air flow path near one of the inlet and the outlet and the precipitator plate can be located in the air flow path near the other of the inlet and the outlet. The blower can be located in the air flow path between the ionizer and the at least one precipitator plate.

The at least one air cleaning module can comprise an array of horizontally disposed collecting plates, and an array of vertically disposed ionizing wires. The array of vertically disposed ionizing wires can be separable from the array of vertically disposed collecting plates.

The at least one air cleaning module can comprise an array of vertically disposed collecting plates, and at least one air cleaning module comprises an array of vertically disposed ionizing wires. The horizontally disposed collection plates can be curved in complementary relationship to the blower. The array of vertically disposed ionizing wires can be separable from the array of vertically disposed collecting plates. The air cleaner can further comprise a wire cleaner having at least one cleaning pad for cooperative registry with the vertically disposed ionizing wires. The wire cleaner can be movable relative to the array of vertically disposed ionizing wires so that the at least one cleaning pad moves along the vertically disposed ionizing wires to clean the wires.

In another embodiment, a vertical air cleaner comprises a housing having an elongated configuration and comprising an inlet and an outlet to define an air flow path from the inlet to the outlet, a blower located within the air flow path and operable to draw air into the inlet and expel air through the outlet, an air cleaning element located within the air flow path, and a base for supporting the elongated housing in a vertical orientation. The size of the base can be independent of the height of the elongated housing. The housing can comprise a peripheral wall, with the inlet formed in one portion of the peripheral wall and the outlet formed in another portion of the peripheral wall, and wherein the housing, the inlet, the outlet, and the air flow path each has an elongated and vertically extending orientation.

The air cleaner element can comprise at least one ionizer and at least one precipitator plate. The at least one ionizer can be a wire. The wire can be vertically orientated, and the length of the wire can be complimentary to the length of the inlet. The air cleaner can further comprise a wire cleaner having at least one cleaning pad for cooperative registry with the wire. The wire cleaner can be movable relative to the ionizing wire so that the at least one cleaning pad moves along the wire to clean the wire.

The vertical air cleaner can further comprise a frame for supporting one of the at least one ionizer and the at least one precipitator plate. The frame can be separable from the other of the at least one ionizer and the at least one precipitator plate. The at least one precipitator plate can comprise an array of alternating ground plates and positively-charged plates. The planar orientation of the plates can be vertical.

The ionizer can be located in the air flow path near one of the inlet and the outlet and the precipitator plate can be located in the air flow path near the other of the inlet and the outlet. The blower can be located in the air flow path between the ionizer and the at least one precipitator plate, and can be a crossflow blower that is vertically oriented within the air flow path.

The vertical air cleaner can further comprise a scroll extending between the inlet and the outlet and defining at least a portion of the air flow path.

DESCRIPTION OF EMBODIMENTS OF THE INVENTION

Figure 1:
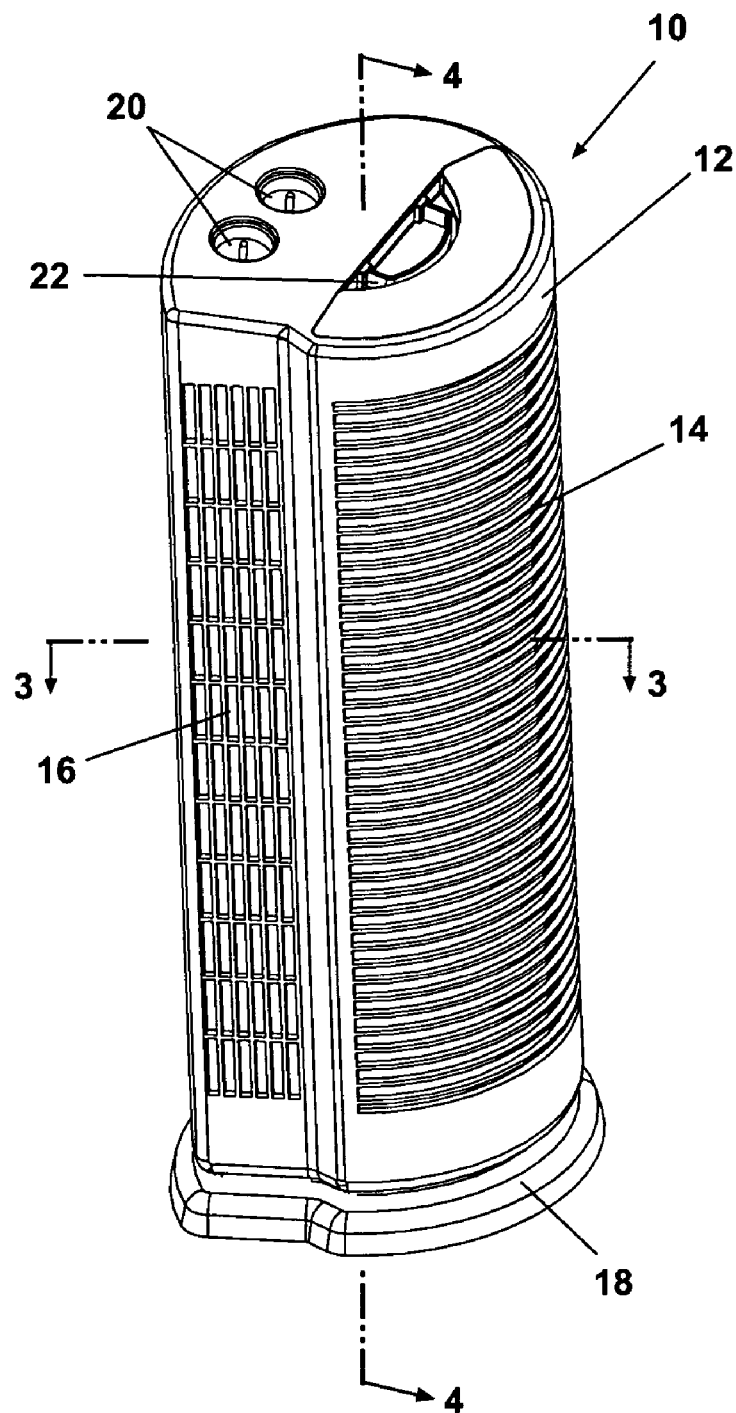
FIG. 1 is a perspective view of a vertical air cleaner according to the invention.

Referring now to the figures, and in particular to FIG. 1, a vertical air cleaner 10 is illustrated comprising an outer housing 12 having an inlet grille 14 and an outlet grille 16, and attached to a base 18. The vertical air cleaner 10 has a generally elongated, slim configuration resulting in a small footprint defined by the base 18. The top of the housing 12 can be provided with operational controls 20 and a lift handle 22.

The front of the housing 12 and the inlet grille 14 have an arcuate shape. The inlet grille 14 can be immovably fixed to the housing 12. Alternately, and preferably, the inlet grille 14 covers an opening in the housing (not shown) and is hingedly attached to the housing 12 for movement between open and closed positions to enable access to the interior of the housing 12 through the opening.

Several embodiments of the vertical air cleaner are described and illustrated in the following description and the figures, each of which is adapted for enclosure within the same outer housing 12 and base 18. Thus, in describing the several embodiments, reference will generally be made only to the different elements comprising the embodiments. As well, like elements will be identified with like numerals, except when otherwise indicated.

As used herein, Clean Air Delivery Rate (CADR) is a measure of the number of CFM (cubic feet per minute) of air an air cleaner cleans of a specified material. How well an air cleaner works is determined by the percentage of pollutants removed as air flows through the cleaner, combined with the volume of air that flows through the unit. CADR is determined through a test procedure devised by the Association of Home Appliance Manufacturers (AHAM), which evaluates the combined effectiveness of filtration and capacity and quantifies the volume of cleaned air delivered by an air cleaner. The higher the CADR number, the faster the unit cleans the air. In effect, the CADR is the volume of clean air that is discharged every minute from an air cleaner.

Figure 2:
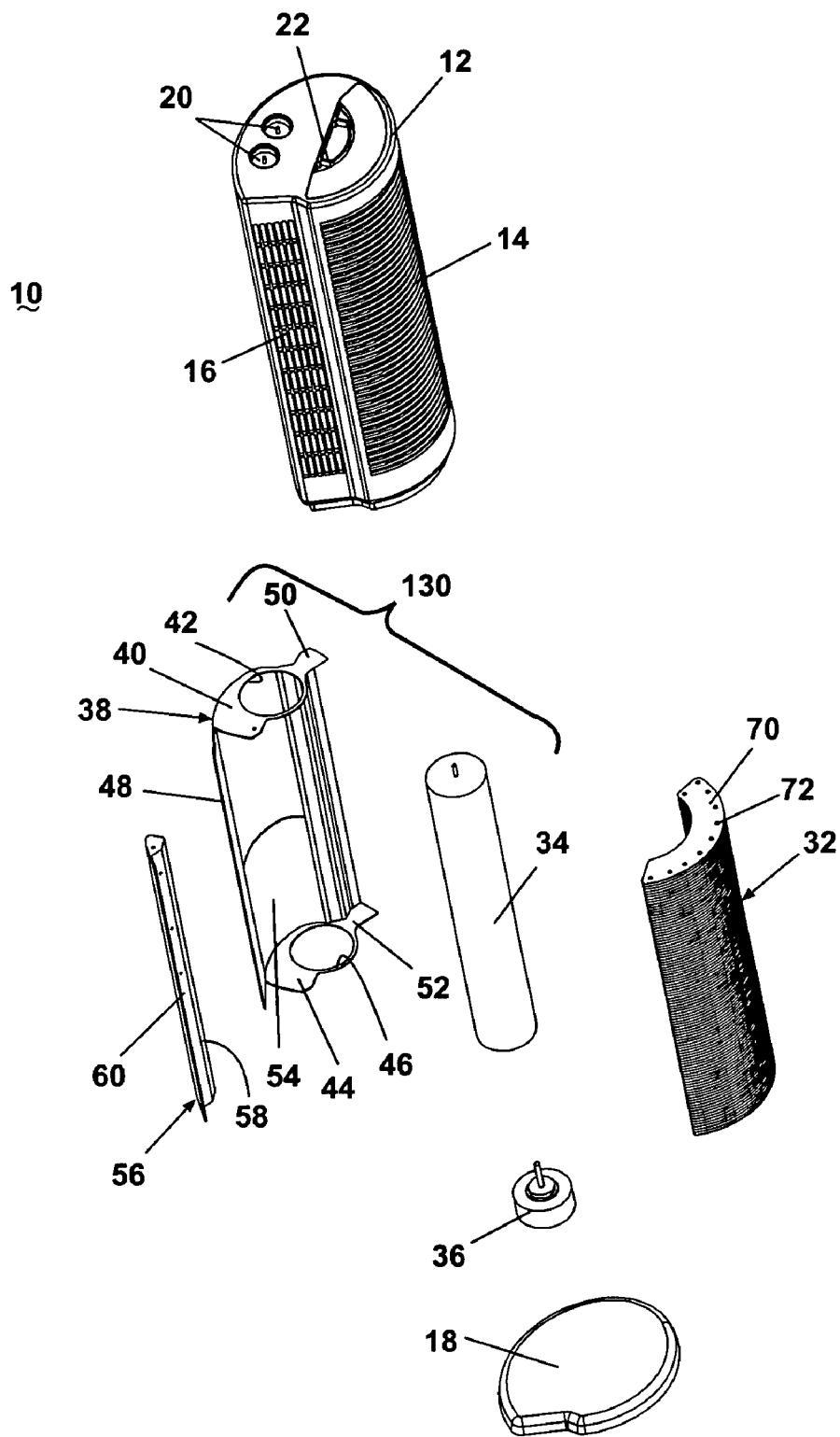
FIG. 2 is an exploded view of a first embodiment of the vertical air cleaner illustrated in FIG. 1.
Figure 3:
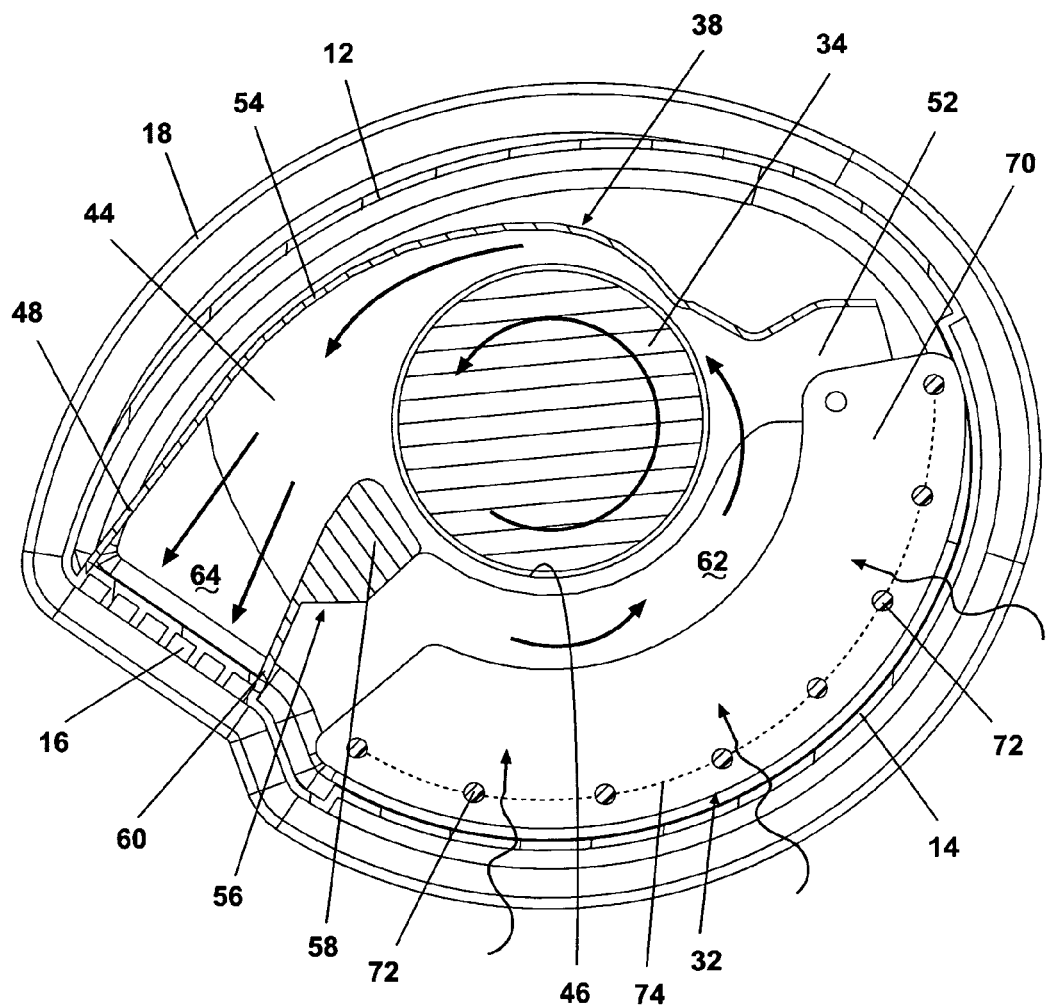
FIG. 3 is a sectional view of the first embodiment of the vertical air cleaner taken along view line 3-3 of FIG. 1, illustrating an array of alternating horizontal electrostatic precipitator plates and ionizing wires.
Figure 4:
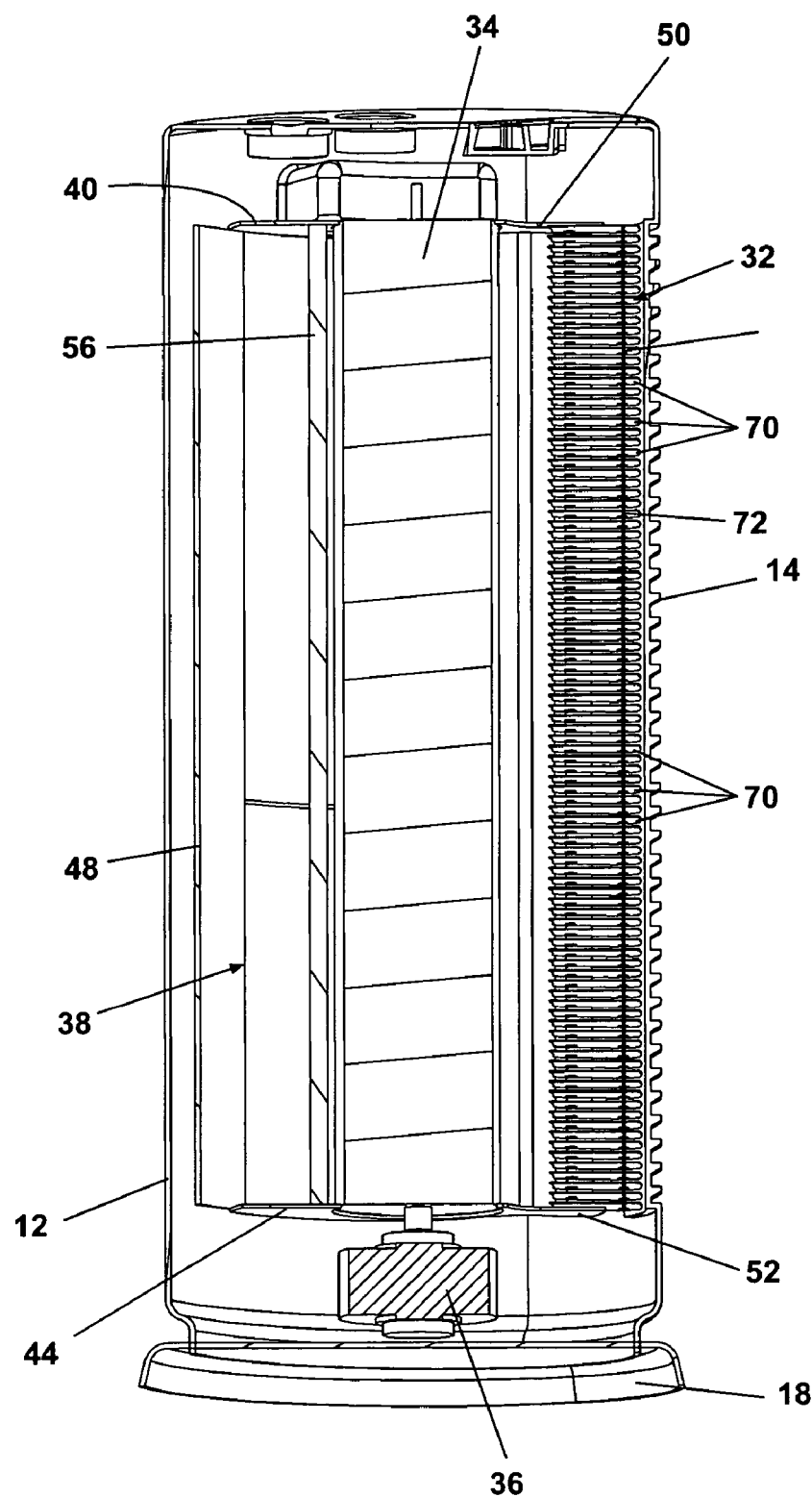
FIG. 4 is a sectional view of the vertical air cleaner taken along view line 6-6 of FIG. 1.

A first embodiment of the vertical air cleaner 10 is illustrated in FIGS. 2-8. As illustrated in FIGS. 2 and 3, the vertical air cleaner 10 comprises a fan assembly 30 and an electrostatic precipitator 32. The fan assembly 30 comprises a cylindrical crossflow fan 34 mounted for rotation about a vertical axis parallel to the longitudinal axis of the vertical air cleaner 10. The crossflow fan 34 is operably attached to a generally cylindrical fan motor 36 and is adapted for rotation by the rotation of the motor 36. Preferably, the motor 36 is positioned beneath the fan 34, as illustrated in FIG. 4.

Figure 5:
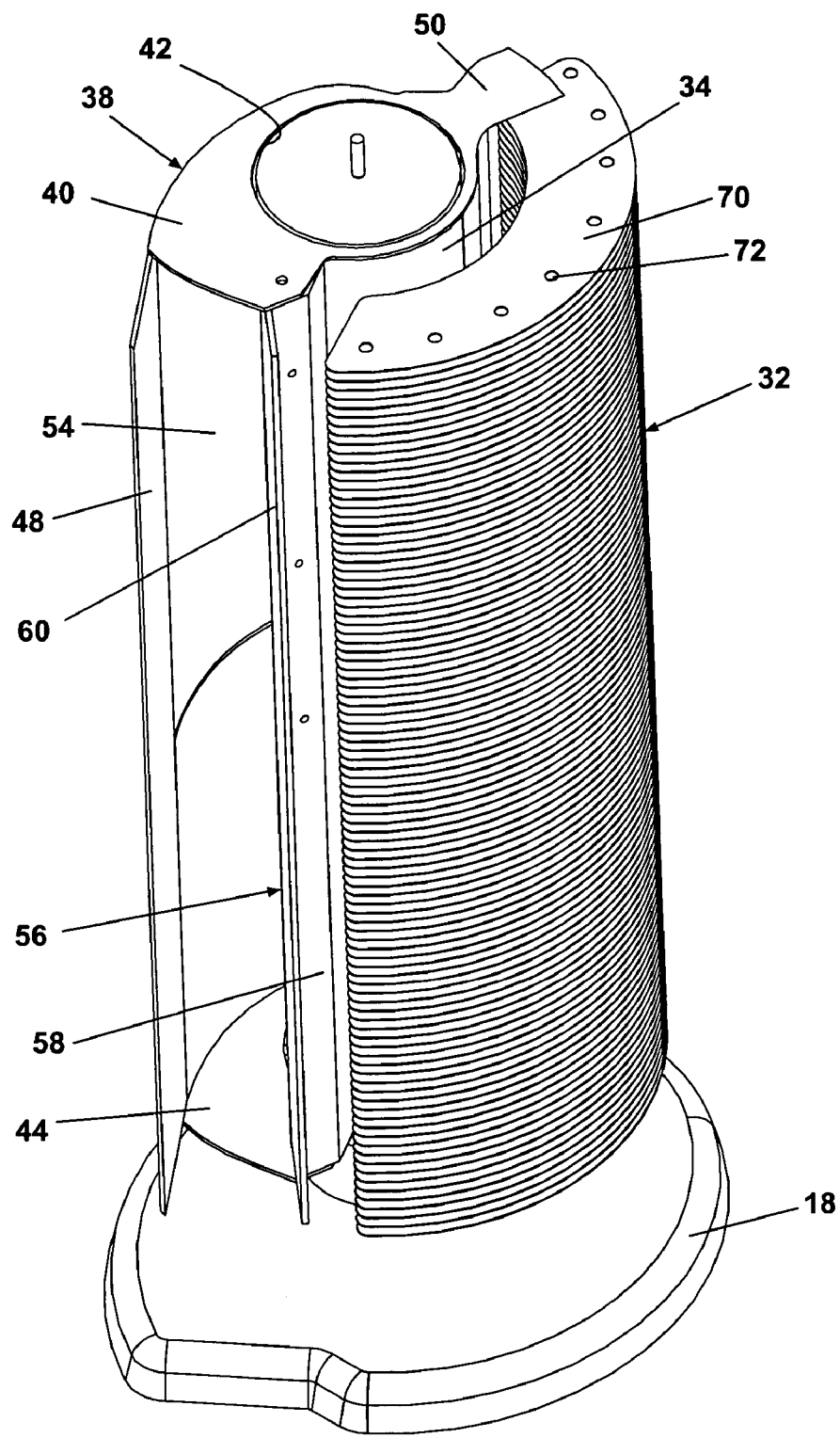
FIG. 5 is a perspective view of the vertical air cleaner illustrated in FIG. 1 with an outer housing removed to show the inner components.

As illustrated in FIGS. 2, 3, and 5, the scroll 38 is a shell-like body having a top wall 40 with a fan opening 42 therethrough, an opposed, parallel bottom wall 44 with a fan opening 46 therethrough, and an arcuate wall 54 joining the walls 40, 44. The arcuate wall 54 extends away from the walls 40, 44 to terminate in a longitudinal flange 48. The fan openings 42, 46 are sized to slidably receive the crossflow fan 34. Extending laterally away from the top wall 40 is a coplanar mounting flange 50. Extending laterally away from the bottom wall 44 is a coplanar mounting flange 52. The scroll 38 defines in large part an air flow path between the inlet 14 and the outlet 16. As illustrated in FIG. 3, an inlet chamber 62 is defined in the region of the precipitator 32 upstream of the crossflow fan 34, and an outlet chamber 64 is defined in the region downstream of the crossflow fan 34 to the outlet grille 16.

Figure 6:
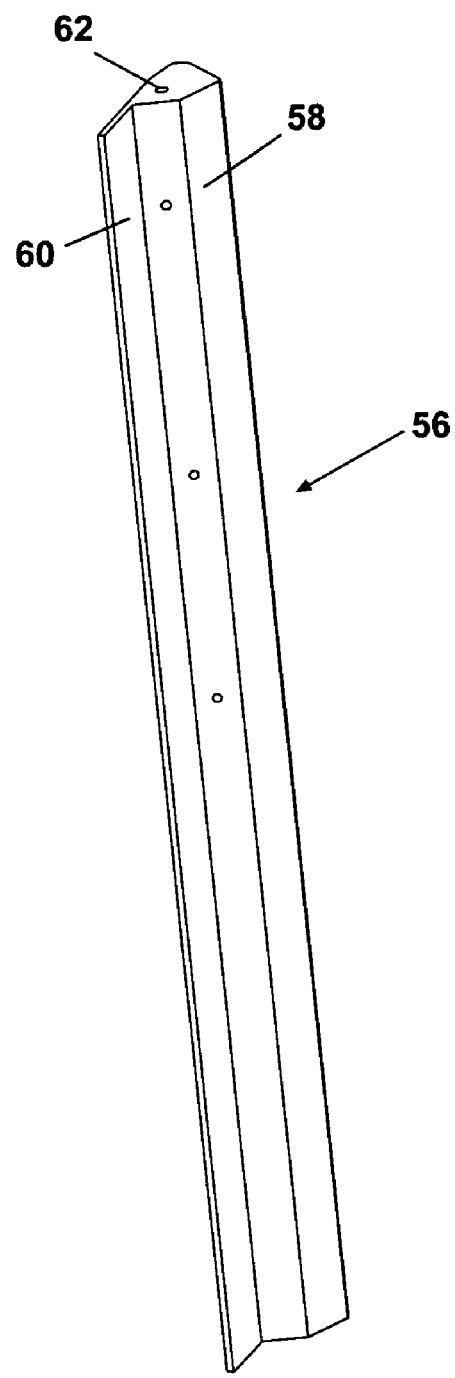
FIG. 6 is a perspective view of a pillar tongue comprising a portion of the vertical air cleaner illustrated in FIG. 1.

As illustrated in FIG. 6, a pillar tongue 56 is an elongated member having an irregular cross-section, and comprising a pillar body 58 and a flange piece 60. The pillar tongue 56 is adapted to be mounted between the top wall 40 and the bottom wall 44 of the scroll 38 to define with the flange 48 a flow channel opening through the outlet grille 16. The pillar tongue 56 defines part of the air flow path from the inlet to the outlet.

The air flow path through the air cleaner 10 starts at the inlet 14, which is located on the front of the air cleaner 10, curves as it follows the scroll 38, and exits the outlet 16, which is located on the side of the fan. This air flow path is beneficial in that the air cleaner 10 can be positioned against a wall without interfering with the air flow rate through the air cleaner.

When assembled, the fan 34 extends through the fan openings 42, 46 to extend the length of the scroll 38. The motor 36 is mounted below the fan 34 beneath the bottom wall 44 using a suitable housing or mounting frame attached to the bottom wall 44. The fan 34 and the electrostatic precipitator 32 are provided with an appropriate power supply and control devices for controlling the operation of the fan 34 and electrostatic precipitator 32. In one embodiment, the fan 34 and the electrostatic precipitator 32 can be independently controlled so that the vertical air cleaner 10 can be used as a fan alone, or the precipitator 32 can be used alone similar to a conventional air cleaner.

The structure and operation of an electrostatic precipitator are generally well known, and will not be described herein except as otherwise necessary for a complete understanding of the invention. In short, the precipitator generates ions which accumulate on particles suspended in the air, and the charged particles are drawn to and held on collection plates comprising a portion of the precipitator. The electrostatic precipitator 32 described herein is illustrated as a unit which is mounted in the interior of the air cleaner housing 12. Alternatively, the precipitator 32 can comprise part of the inlet grille 14, either integrated with the grille 14 or mounted to the inside or downstream side of the grille 14. The precipitator 32 can also be attached, in whole or in part, to the inside of a grille 14 which is hingedly attached to the housing 12 so that opening of the grille 14 will provide full access to the portion of the electrostatic precipitator 32 attached to the grille 14.

The electrostatic precipitator 32 illustrated in FIGS. 2-8 comprises horizontal, arcuate precipitator plates 70, although other configurations, such as segmented or rectilinear plates, can be utilized. The use of curved plates results in a more compact electrostatic precipitator, and increased plate area to thereby increase the CADR. The precipitator plates 70 are assembled in a stacked, horizontally disposed, spaced-apart configuration.

Figure 7:
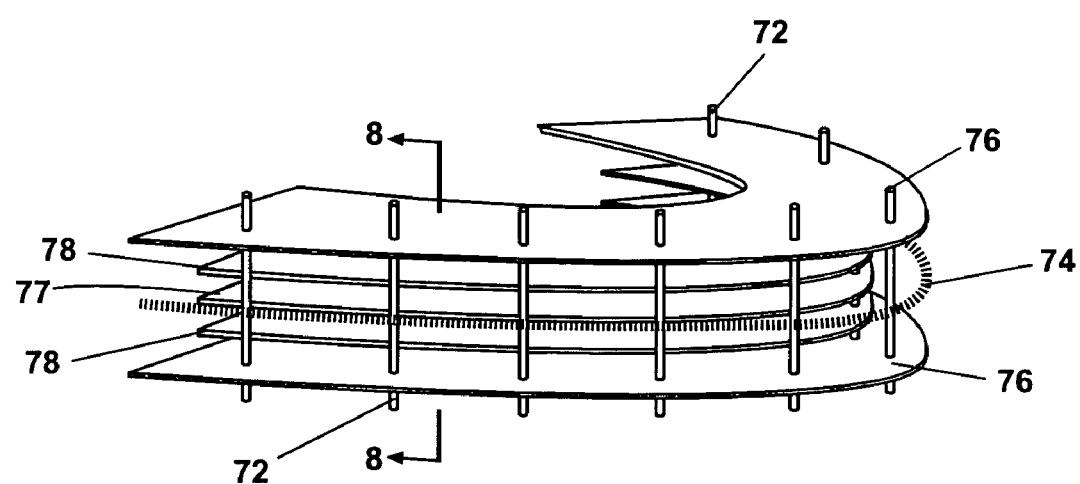
FIG. 7 is a perspective view of a portion of the array of alternating horizontal electrostatic precipitator plates and ionizing wires illustrated in FIG. 3.
Figure 8:
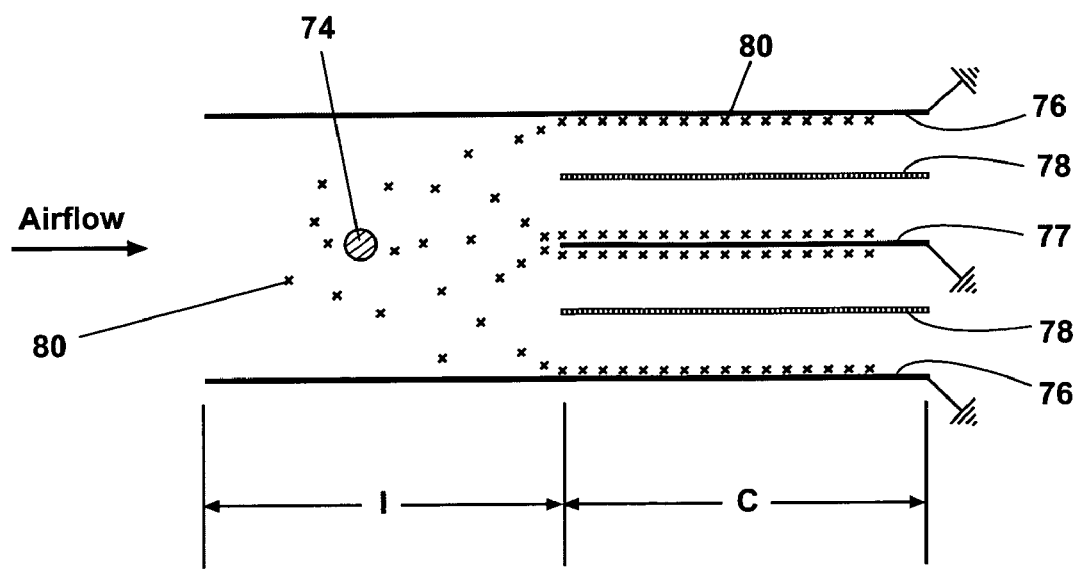
FIG. 8 is a schematic of a section of the electrostatic precipitator of FIG. 7 taken along view line 8-8.

FIGS. 7 and 8 illustrate the details of the electrostatic precipitator 32. The precipitator plates comprise an array of alternating ground plates 76, 77, and positively-charged high-voltage plates 78 having a curved array of vertically disposed support rods 72 extending therethrough the full height of the precipitator 32. An ionizing wire 74, also referred to as a discharge wire, is suspended on the support rods 72 to curve along an outer portion of the precipitator 32 parallel to an outer edge of the plates 70.

The electrostatic precipitator 32 can be functionally divided into an ionizing section I (FIG. 8), and a collecting section C (FIG. 8). Every other ground plate 76, referred to herein as a full width ground plate, extends over the ionizing section I and the collecting section C. The alternating ground plates 77, referred to herein as a half width ground plate, extend over only the collecting section C. Similarly, the high-voltage plates 78 extend over only the collecting section C. Intermediate the full width ground plates 76 in the ionizing section is the ionizing wire 74.

The separation of the precipitator plates 70 enables air to flow between the plates 70 under the influence of the rotation of the crossflow fan 34. The electrostatic precipitator 32 can be held between the mounting flanges 50, 52 to maintain the assembly 32 in a selected position relative to the scroll 38. The precipitator 32 can also be supported within the housing 12 independent of the scroll 38, such as with a removable frame, and provided with a handle (not shown), to enable removal of the precipitator 32 for cleaning.

As illustrated schematically in FIG. 8, energizing of the ionizing wire 74 produces positively-charged ions 80. These ions 80 accumulate on particulate matter suspended in the air, thereby imparting a positive electrical charge to the suspended particles. Ions 80 which do not accumulate on a suspended particle are attracted to the full width ground plates 76. Airflow caused by the rotation of the fan 34 urges migration of the positively-charged suspended particles toward the collecting section C. The alternating high-voltage plates 78 and the ground plates 76, 77 generate an electrical field which contributes to migration of the suspended particles to the ground plates 76, 77 in the collecting section C. The suspended particles are removed from the air and retained on the ground plates 76, 77 for later removal through a plate cleaning process.

Referring again to FIG. 3, in operation, the fan 34 rotates in a counterclockwise direction as viewed from above. Rotation of the fan 34 draws air through the inlet grille 14, the electrostatic precipitator 32, and into the scroll 38. Passage of the air through the electrostatic precipitator 32 removes suspended electrically-charged impurities from the air to be deposited on the collection plates 76, 77. The purified air is brought around the fan 34 along the arcuate wall 54 of the scroll 38 to be expelled along the passageway defined by the pillar tongue 56 and the flange 48, and through the outlet grille 16.

Figure 9:
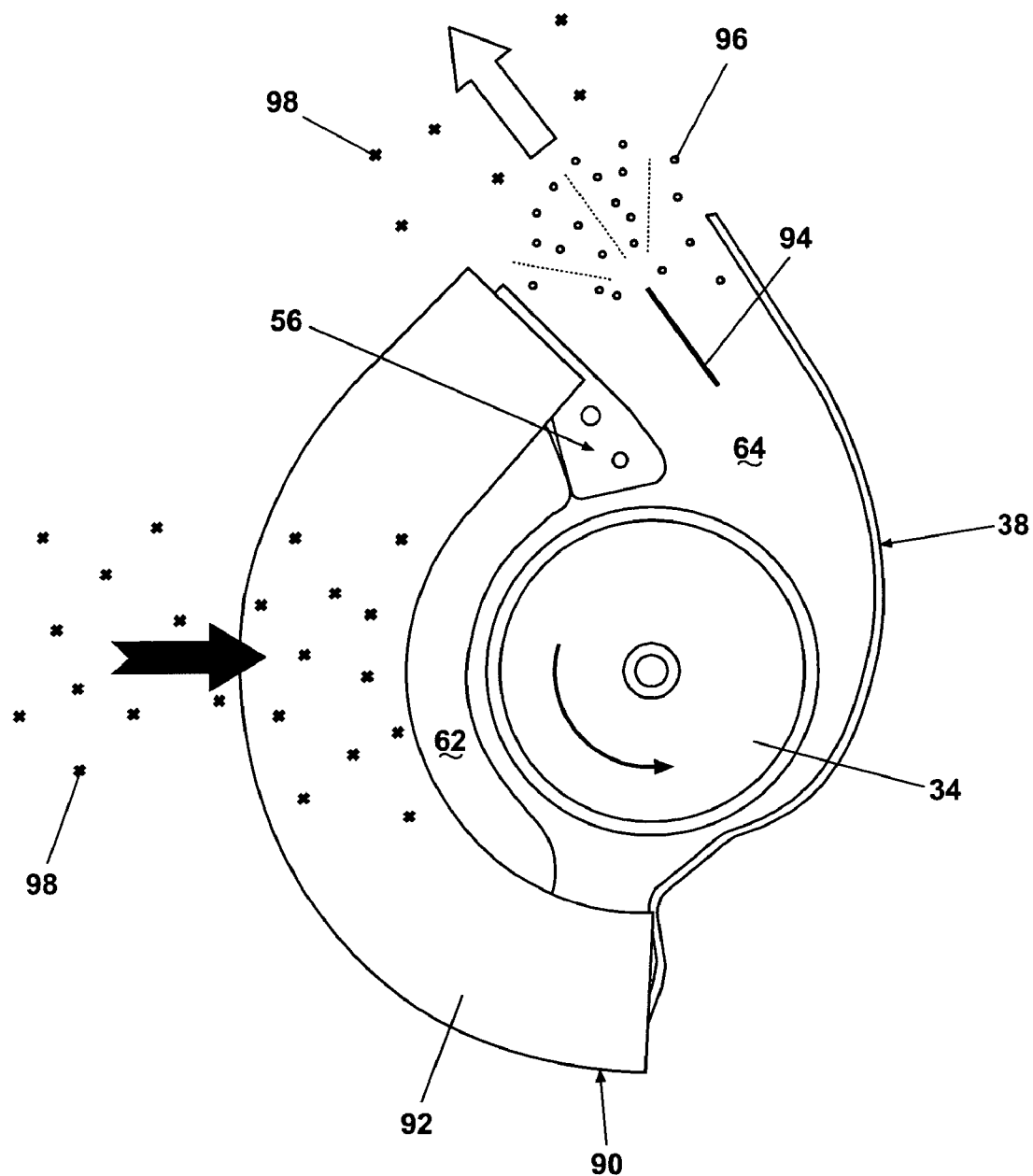
FIG. 9 is a schematic view similar to FIG. 3 illustrating a second embodiment of the vertical air cleaner.

FIG. 9 illustrates a second embodiment of the air cleaner 10 in which the ionizing section and the collecting section are separated into different locations within the housing 12, and the collecting section is upstream of the crossflow fan 34 and the ionizing section is downstream of the crossflow fan 34. The collecting section comprises a plate array 90 comprising a plurality of curved precipitator plates 92 assembled in a stacked, horizontally disposed, spaced-apart configuration and comprising alternating positively charged plates and ground plates similar to the previously described collecting section C. The plate array 90 is located between the inlet grille 14 and the crossflow fan 34 in approximately the same location within the housing 12 as the previously described electrostatic precipitator 32. An ionizer element 94, which can be a plate, a wire, a grid of wires, and the like, is located in the outlet chamber 64 remote from the plate array 90.

The ionizer element 94 produces ions 96 which exit the air cleaner 10 through the outlet grille 16 and attach to air suspended particles 98, which become electrically charged as described previously. The particles 98 are brought through the inlet grille 14 into the precipitator plate array 90 where the charged particles 98 are collected on the grounded precipitator plates 92 as previously described. Clean air then enters the inlet chamber 62 and is delivered by the crossflow fan 34 to the outlet chamber 64 where the ionizer element 94 again produces ions 96, which exit the air cleaner 10 through the outlet grille 16. As suspended particles 98 are removed from the air, the air becomes more beneficially concentrated with ions 96.

Figure 10:
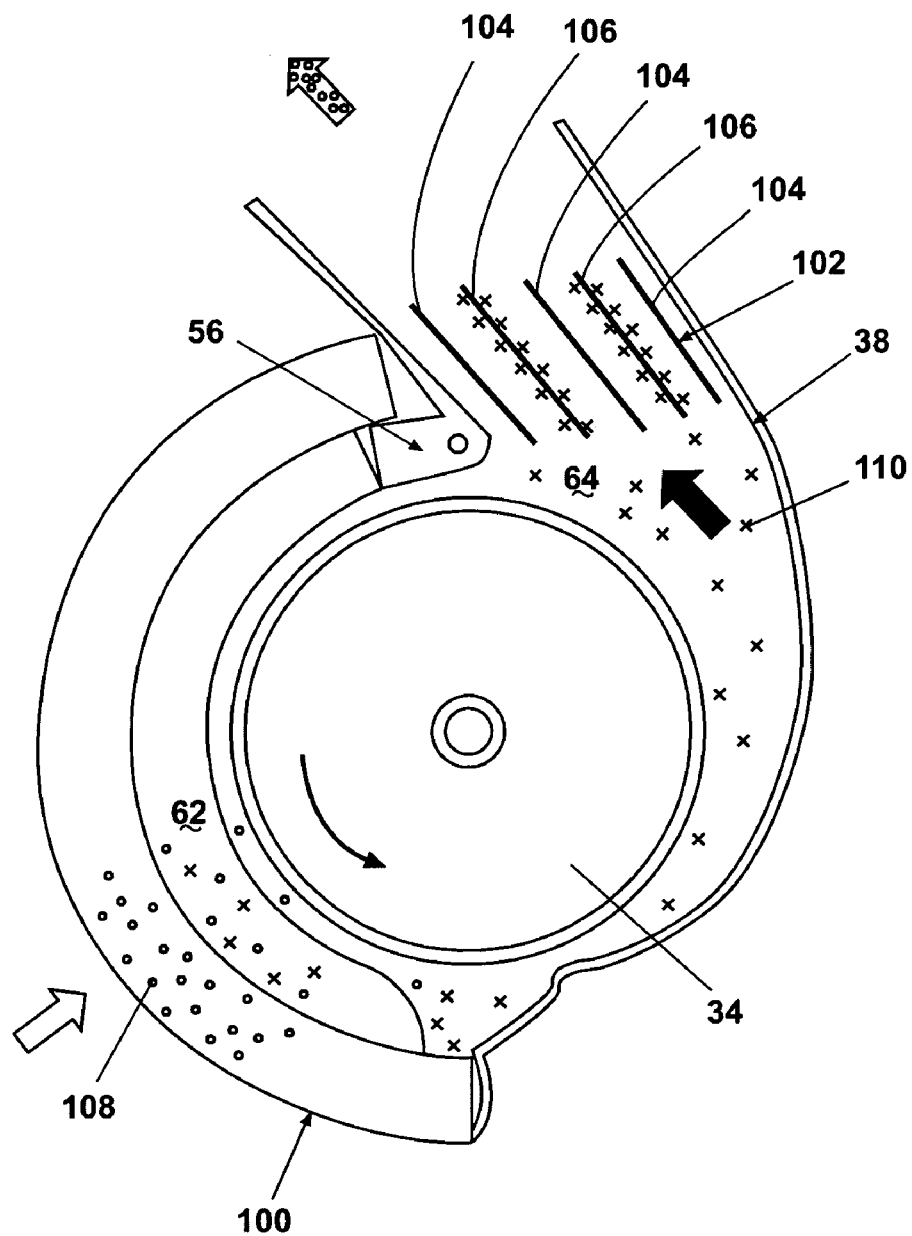
FIG. 10 is a schematic view similar to FIG. 3 illustrating a third embodiment of the vertical air cleaner.

FIG. 10 illustrates a third embodiment of the air cleaner 10 in which the ionizing section and the collecting section are separated into different locations within the housing 12, with the collecting section downstream of the crossflow fan 34 and the ionizing section upstream of the crossflow fan 34. The ionizing section comprises an ionizing array 100 comprising a plurality of curved plates assembled in a stacked, horizontally disposed, spaced-apart configuration. Alternatively, the ionizing section can comprise a grid of ionizing wires suspended in a suitable framework.

The collecting section comprises a precipitator array 102 assembled in a parallel, vertically disposed, spaced-apart configuration comprising alternating high-voltage positively charged plates 104 and ground plates 106. Alternatively, the precipitator array 102 can comprise parallel, horizontally disposed plates 104, 106.

The ionizing array 100 produces ions 108 which enter the inlet chamber 62 and attach to air suspended particles 110, which become electrically charged as described previously. The charged particles 110 migrate under the influence of the crossflow fan 34 from the inlet chamber 62 to the outlet chamber 64 and through the precipitator array 102. The charged particles 110 are collected on the ground plates 106. Free ions 108 are collected on the high-voltage plate 104.

Figure 11A:
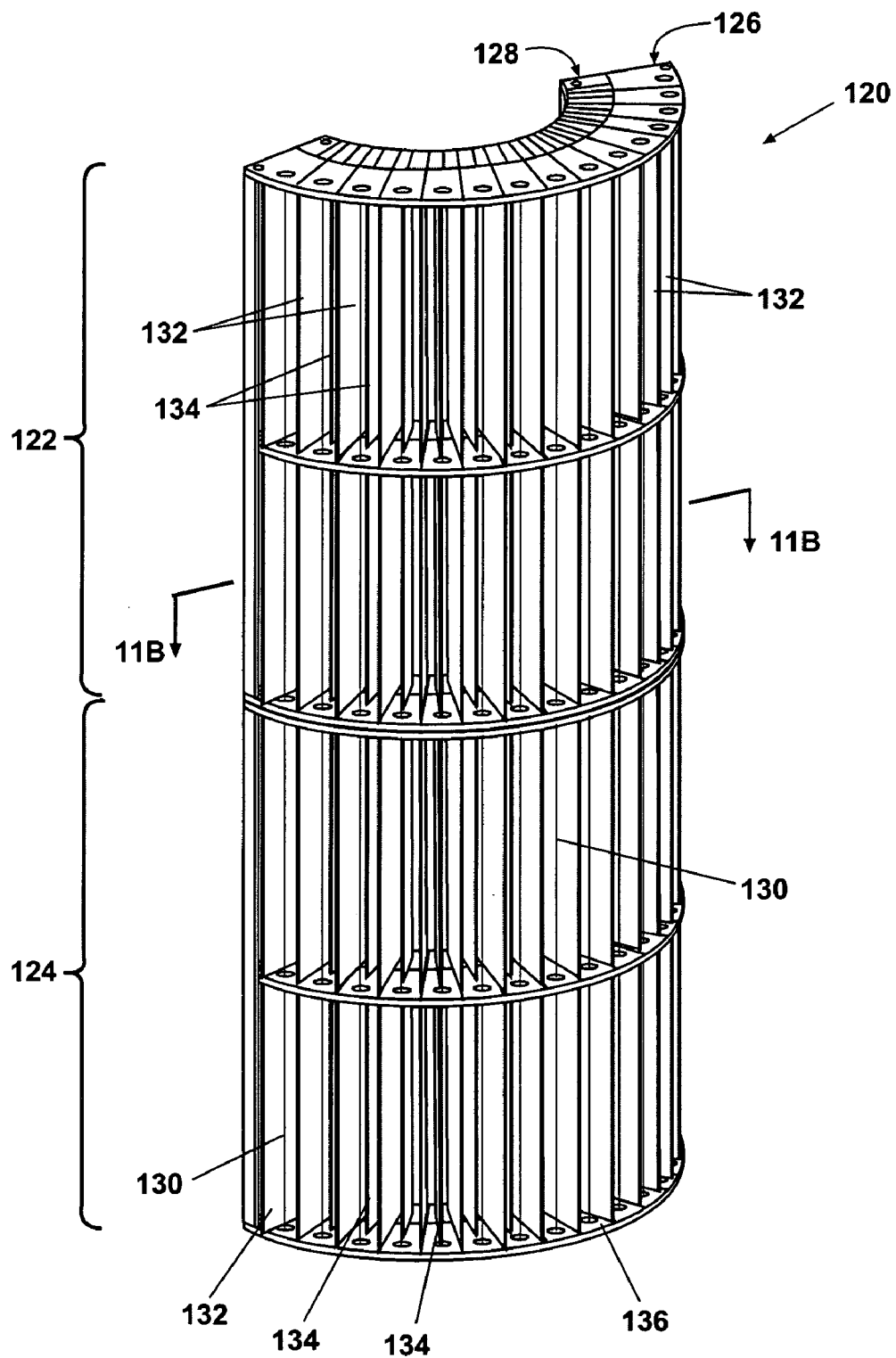
FIG. 11A is a perspective view illustrating a fourth embodiment of the vertical air cleaner illustrated in FIG. 1, illustrating an array of alternating vertical electrostatic precipitator plates and ionizing wires.
Figure 11B:
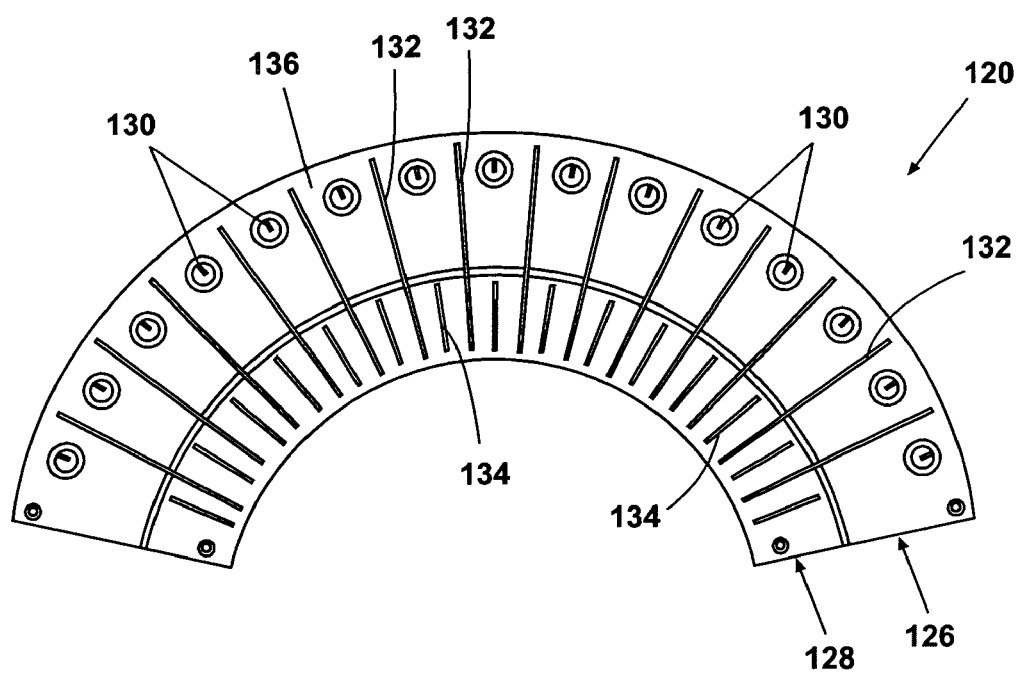
FIG. 11B is a sectional view of the array of alternating vertical electrostatic precipitator plates and ionizing wires taken along view line 11B-11B of FIG. 11A.

FIGS. 11A and 11B illustrate an alternative embodiment of a vertically-oriented electrostatic precipitator 120 that can be used in place of the horizontally-oriented, stacked plates shown in FIGS. 1-8. The vertically-orientated electrostatic precipitator 120 is illustrated as comprising multiple modules, in this case an upper module 122 and an identical lower module 124. Any number of modules can be assembled into the vertically-orientated precipitator 120 to produce an electrostatic precipitator having a preselected CADR.

The modules 122, 124 comprise a discharge array 126 and a collecting array 128 in cooperative registry having an arcuate configuration. The discharge array 126 comprises an array of vertical ground plates 132 in radially disposed spaced-apart configuration supported between arcuate support plates 136 that encompass both the discharge array 126 and the collecting array 128. The vertical ground plates 132 comprise a portion of both the discharge array 126 and the collecting array 128.

A plurality of ionizing wires 130 extend vertically through the discharge array 126 along an outer curved edge thereof between each pair of ground plates 132. The collecting array 128 comprises an array of high-voltage plates 134 in radially disposed spaced-apart configuration extending from an inner curved edge of the collecting array 128 to the discharge array 126. Each high-voltage plate 134 is interposed between a pair of ground plates 132, generally coplanar with an ionizing wire 130.

The vertically-orientated precipitator 120 can have a handle (not shown) or other suitable mechanism for removal of the vertically-orientated precipitator 120 from the housing 12 for cleaning of the precipitator 120. It is anticipated that the precipitator 120 will be adapted so that it can be placed in an automatic dishwasher for cleaning.

Figure 12A:
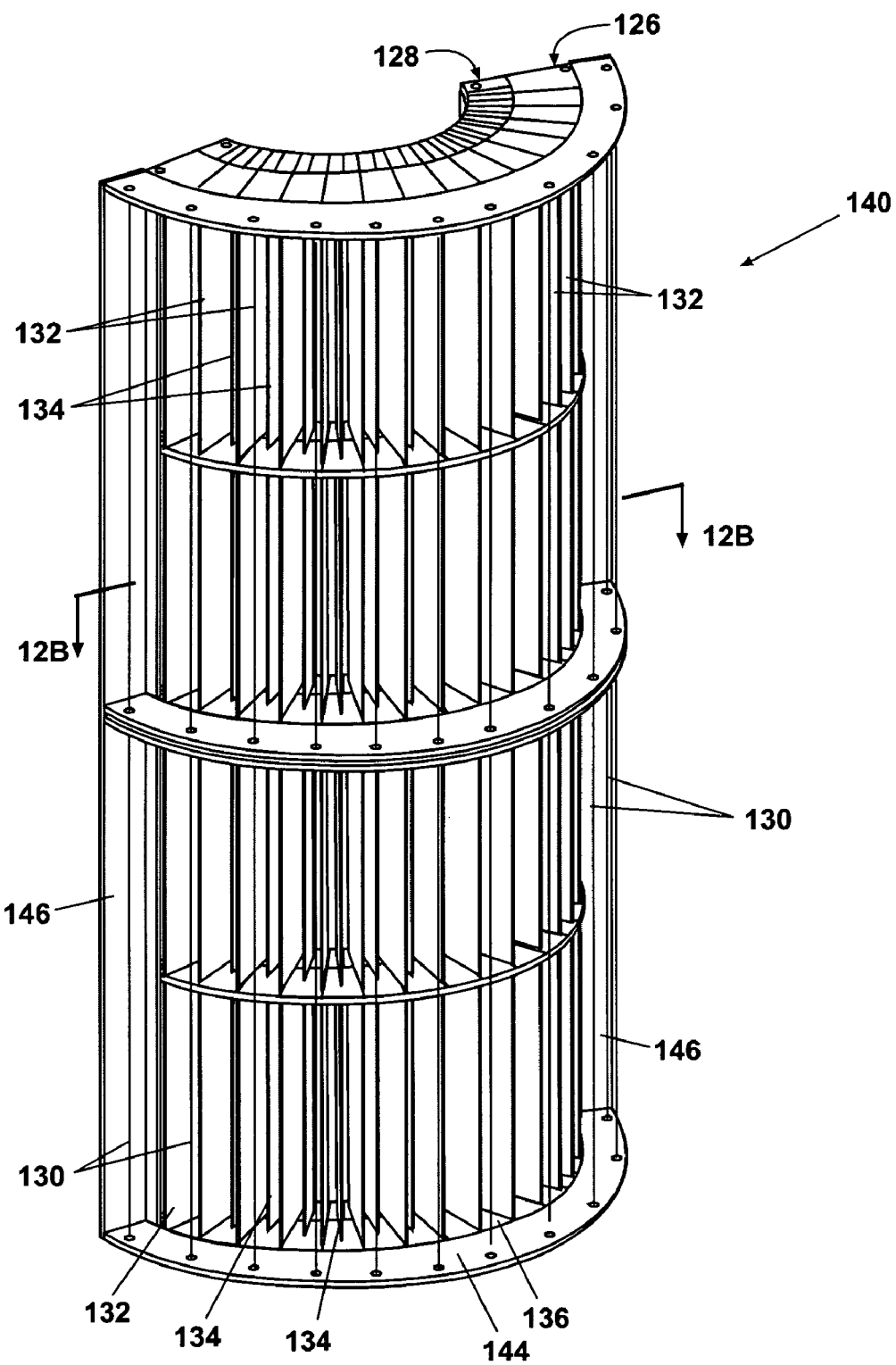
FIG. 12A is a perspective view illustrating a fifth embodiment of the vertical air cleaner illustrated in FIG. 1, illustrating an array of alternating vertical electrostatic precipitator plates and a frame supporting a plurality of ionizing wires.
Figure 12B:
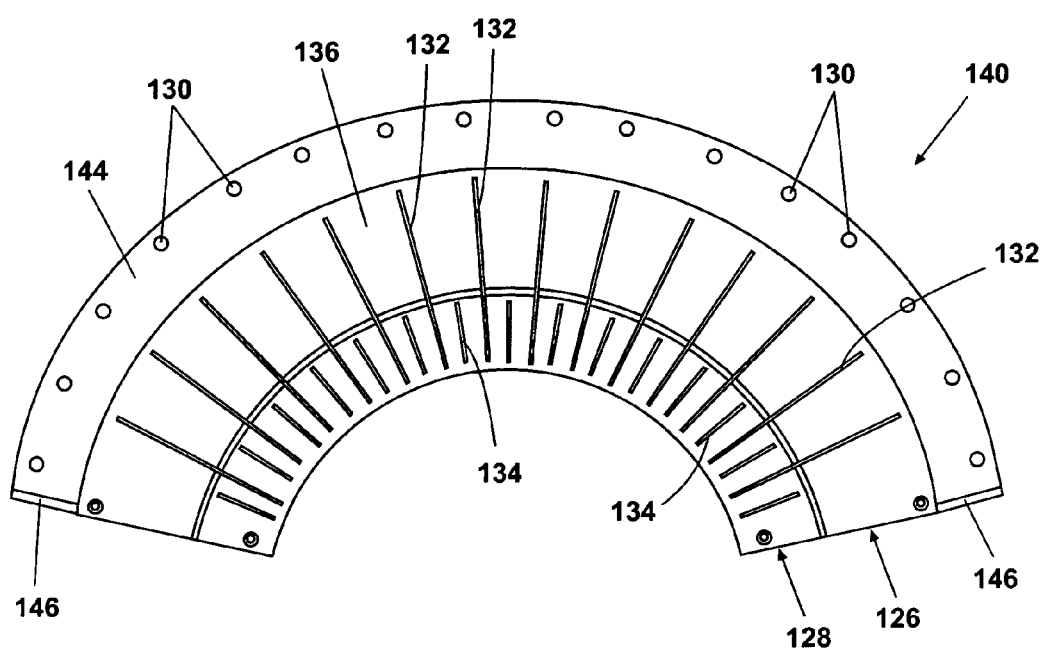
FIG. 12B is a sectional view of the array of alternating vertical electrostatic precipitator plates and the frame supporting the plurality of ionizing wires taken along view line 12B-12B of FIG. 12A.

FIGS. 12A-B illustrate an alternative embodiment 140 of the vertical plate electrostatic precipitator comprising a variation of the vertical plate module. In this embodiment, the array of ground plates 132, high-voltage plates 134, and support plates 136 is similar to the array described with respect to the vertically-orientated precipitator 120. However, the ground plates 132 extend radially as illustrated in FIG. 12B, and the ionizing wires 130 are supported in an arcuate, separable ionizing wire support frame 142. The support frame 142 comprises a pair of parallel, arcuate support plates 144 attached to a pair of rectilinear end walls 146 so that the support plates 144 are coplanar with the support plates 136. The ionizing wires 130 are spaced regularly along the support plates 144 in a vertically disposed, parallel configuration. The support plates 144 are provided with a plurality of radially-spaced slots (not shown) intermediate the attachment points for the ionizing wires 130 complementary to the extension portions of the ground plates 132, as illustrated in FIG. 12B.

The vertical plate module 140 is adapted for ready removal of the vertical plate module 140 from the housing 12 for cleaning of the plates 132, 134. The ionizing wire support frame 142 is adapted for permanent or semi-permanent attachment to the housing 12, and is not removed with the vertical plate module 140. Ionizing wires are generally very thin and fragile. Removal of a module containing the ionizing wires 130 increases the risk of damage to one or more of the wires 130. Separability of the vertical plate module 140 from the ionizing wire support frame 142 enables the vertical plate module 140 to be removed from the housing 12 for cleaning, while retaining the support frame 142 in the housing, thereby reducing the risk of damage to the wires 130. The slots (not shown) in the support plates 144 enable the separation of the vertical plate module 140 from the ionizing wire support frame 142, while providing a vertical plate electrostatic precipitator having ground plates 132 that extend between the ionizing wires 130.

Figure 13A:
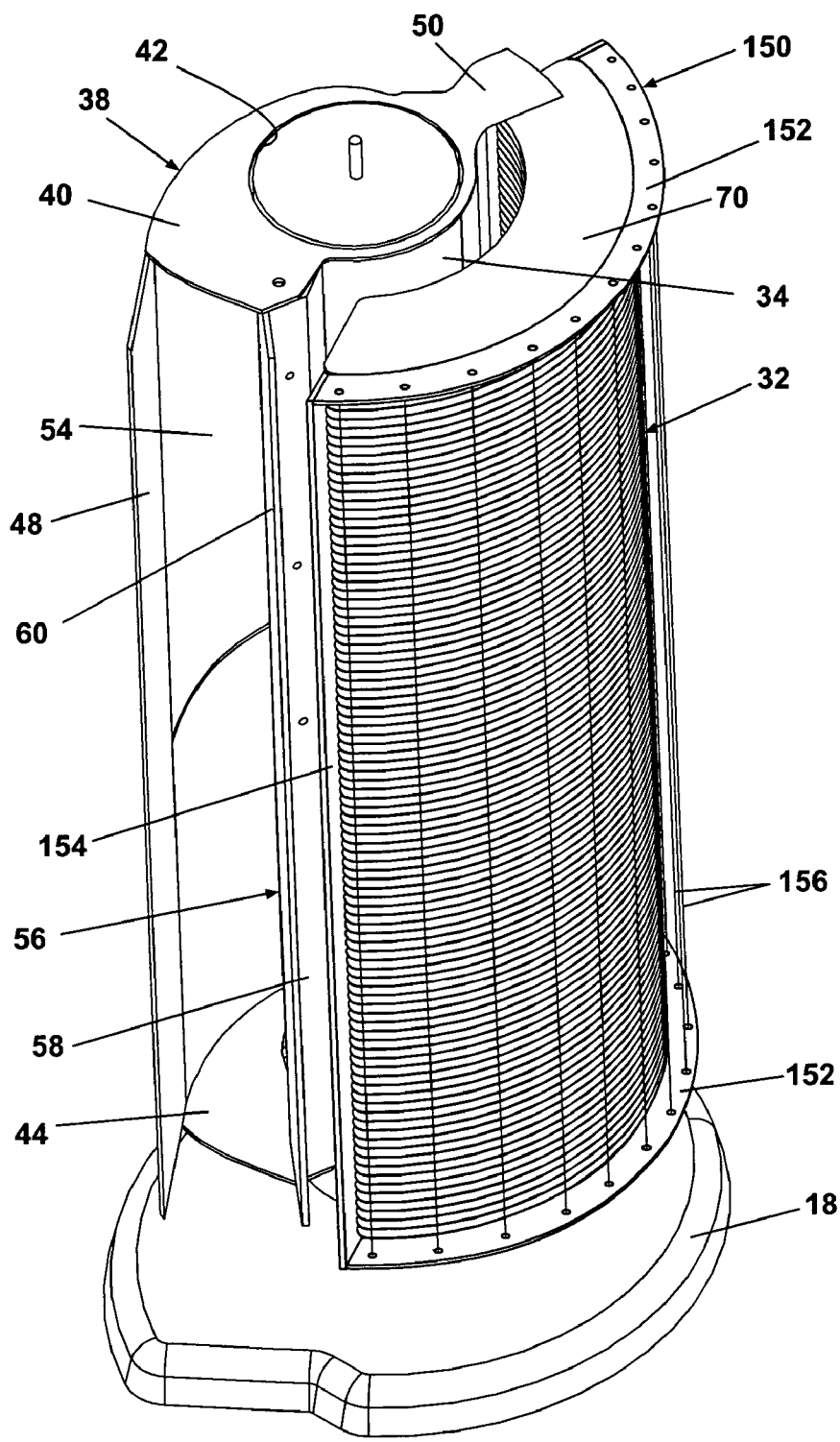
FIG. 13A is a perspective view illustrating a sixth embodiment of the vertical air cleaner illustrated in FIG. 1, illustrating an array of alternating horizontal electrostatic precipitator plates and a frame supporting a plurality of ionizing wires, with the outer housing removed to show the inner components.
Figure 13B:
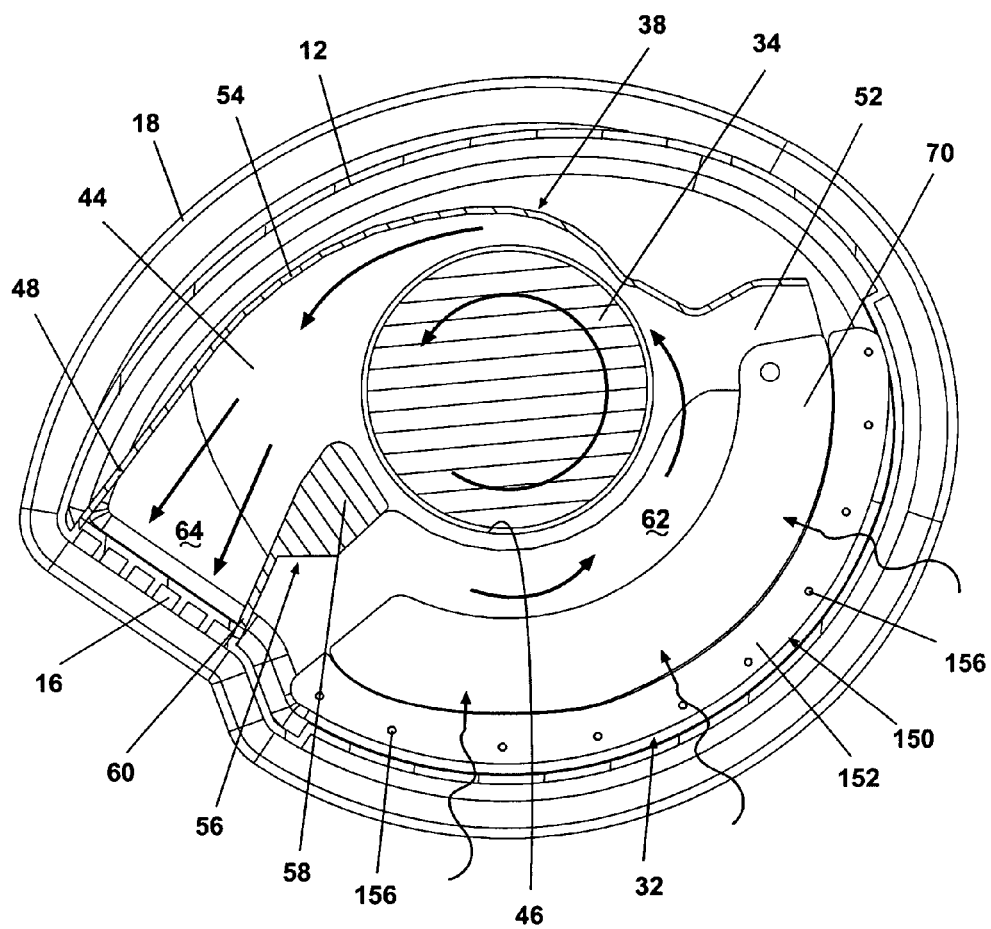
FIG. 13B is a sectional view of the array of alternating horizontal electrostatic precipitator plates and the frame supporting the plurality of ionizing wires taken along view line 3-3 of FIG. 1.

FIGS. 13A and 13B illustrate an embodiment of the electrostatic precipitator in which the precipitator plates 70 are arranged as previously described in FIGS. 1-8. However, an ionizing wire support frame 150 similar to the support frame 142 is used rather than the plate support rods 72 and ionizing wires 74 of the embodiment illustrated in FIGS. 3-8. The ionizing wire support frame 150 comprises a pair of parallel, arcuate support plates 152 attached to a pair of rectilinear end walls 154 so that the support plates 152 are coplanar with the top and bottom plates 70 of the precipitator 32. Ionizing wires 156 are spaced regularly along the support plates 152 in a vertically disposed, parallel configuration.

As with the vertical plate module 140 and the ionizing wire support frame 142, the precipitator plates 70 are adapted for ready removal from the housing 12 for cleaning of the plates. The ionizing wire support frame 150 is adapted for permanent or semi-permanent attachment to the housing 12, and is not removed with the precipitator plates 70, thereby reducing the risk of damage to the wires 156.

Figure 14:
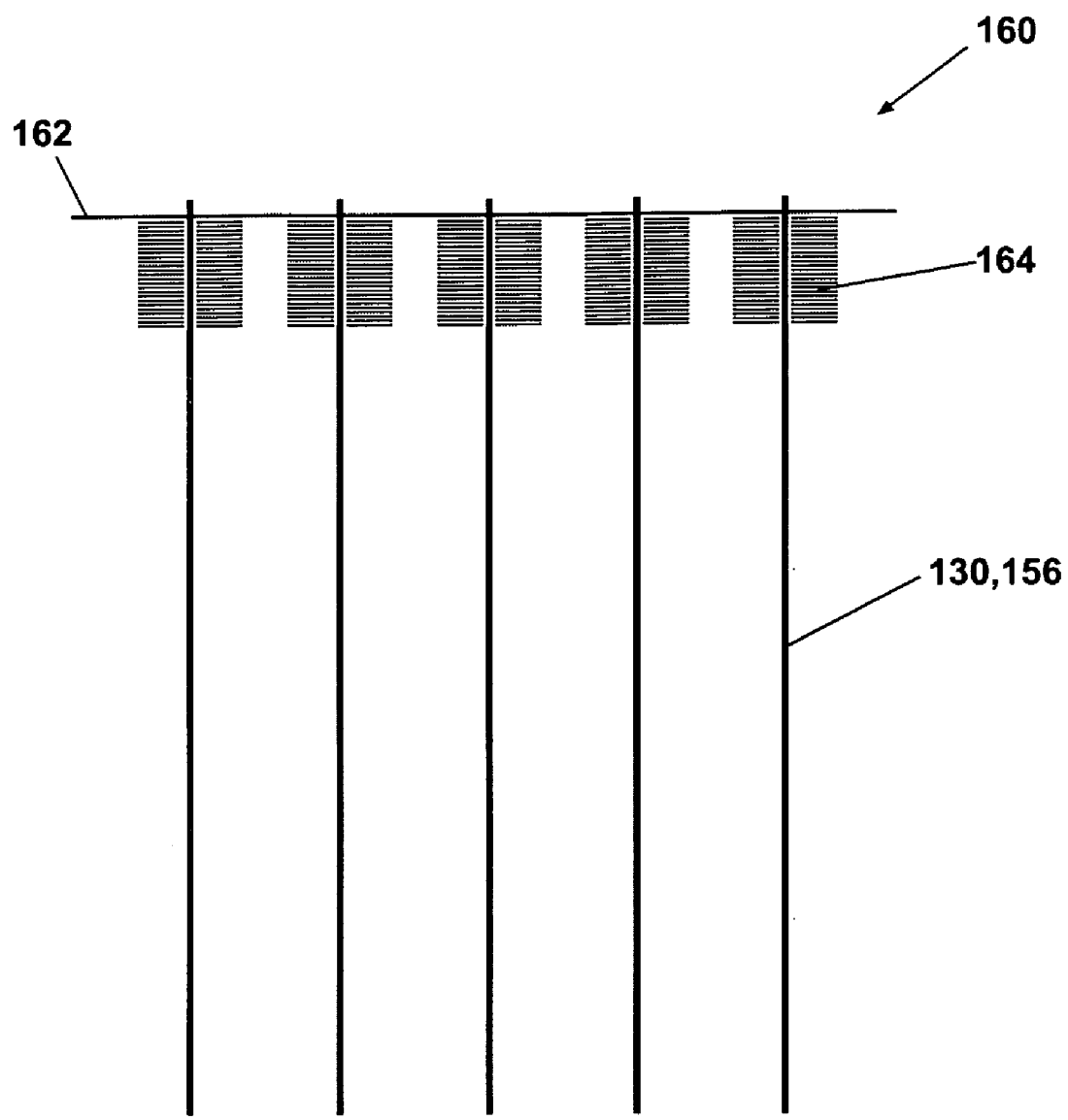
FIG. 14 is a schematic view of a wire cleaning apparatus for cleaning the ionizing wires.

FIG. 14 illustrates a wire cleaner 160 which is adapted for use with the vertically disposed wires illustrated in FIGS. 12A-B and 13A-B. The wire cleaner 160 is adapted with a generally arcuate configuration for cooperative registry with the ionizing wires 130, 156, and comprises an arcuate support plate 162 having a general shape corresponding to the shape of the support plates 144, 152. The support plate 162 is provided with slotted openings having a spacing and configuration adapted for receipt of the ionizing wires 130, 156 therein. Extending from the support plate 162 cooperatively with the slotted openings are cleaning pads 164 of adapted for circumferential contact with the wires 130, 156 when the wires are received in the slotted openings. The wire cleaner 160 can be translated along the wires 130, 156 to clean the wires of any accumulated residue, such as corrosion or oxidation residue, from the air cleaning process. The wire cleaner 160 can also be attached to the vertical plate module 140 or precipitator plates 70 so that the wire cleaner 160 is translated along the wires 130, 156 when the vertical plate module 140 or precipitator plates 70 are removed from the housing 12.

The modular nature of the precipitator provides for highly desirable manufacturing flexibility in that the CADR for the air cleaner can be adjusted by selecting a different number of the precipitator modules. The various other components, such as the scroll, and the crossflow fan, can be elongated as needed or made in lengths corresponding to the module. For example, the fan can be made of multiple segments, with each segment having the same height as the corresponding module 120. Additionally, the modules 120 can come in different heights. In such a situation, the fan segment can, but need not, be of the same height as the corresponding module. The stacking of modules also results in a taller air cleaner, but with the same relatively small footprint thereby minimizing the floor spaced used. In addition to providing a high-capacity air cleaner having a small footprint, the vertical air cleaner described herein has improved aesthetic features due to its slim design. The collection plates can be cleaned by removing the electrostatic precipitator from the housing and washing the precipitator by hand. With the embodiment comprising a separable plate module and ionizing wire support frame, cleaning of the plates can be accomplished in an automatic dishwasher. Finally, the use of collection plates reduces noise considerably compared to a conventional fiber-type filter.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An expandable capacity air cleaner comprising:
    a housing having an inlet and an outlet and defining an air flow path from the inlet to the outlet;
    a blower located within the air flow path and operable to draw air into the inlet and expel air through the outlet and comprising at least one blower module;
    an air cleaning element located within the air flow path and comprising at least one air cleaning module; and
    the blower module and the air cleaning module are matched in at least one of size and capacity wherein the clean air delivery rate of the air cleaner can be selected by selection of the number of air cleaning modules and blower modules.

2. The air cleaner of claim 1, wherein the air cleaning element comprises multiple air cleaning modules.

3. The air cleaner of claim 2, wherein each of the multiple air cleaning modules provides the same clean air delivery rate.

4. The air cleaner of claim 1, wherein the blower module is a crossflow blower having an axis of rotation that is vertically oriented within the air flow path.

5. The air cleaner of claim 1, wherein the housing has an elongated configuration.

6. The air cleaner of claim 5, and further comprising a base for supporting the elongated housing in a vertical orientation.

7. The air cleaner of claim 6, wherein the height of the elongated housing is increased in proportion to the number of air cleaning modules.

8. The air cleaner of claim 7, wherein the size of the base is independent of the height of the elongated housing.

9. The air cleaner of claim 8, wherein the size of the base is constant.

10. The air cleaner of claim 1, wherein the air cleaning module comprises at least one ionizer.

11. An expandable capacity air cleaner comprising:
    a housing having an inlet and an outlet and defining an air flow path from the inlet to the outlet;
    a blower located within the air flow path and operable to draw air into the inlet and expel air through the outlet; and
    an air cleaning element located within the air flow path and comprising at least one air cleaning module, the at least one air cleaning module comprises an array of horizontally disposed collecting plates;
    wherein the clean air delivery rate of the air cleaner can be selected by selection of the number of air cleaning modules comprising the air cleaning element.

12. The air cleaner of claim 11, wherein the horizontally disposed collection plates are curved in complementary relationship to the blower.

13. The air cleaner of claim 12, wherein the at least one air cleaning module comprises an array of vertically disposed ionizing wires.

14. The air cleaner of claim 11, further comprising:
    the housing having an elongated configuration;
    a base for supporting the elongated housing in a vertical orientation; and
    a height of the elongated housing increased in proportion to the number of air cleaning modules.

15. The air cleaner of claim 14, wherein the size of the base is independent of the height of the elongated housing.

16. The air cleaner of claim 14, wherein the size of the base is constant.

17. An expandable capacity air cleaner comprising:
    a housing having an inlet and an outlet and defining an air flow path from the inlet to the outlet;
    a blower located within the air flow path and operable to draw air into the inlet and expel air through the outlet; and
    an air cleaning element located within the air flow path and comprising at least one air cleaning module, the at least one air cleaning module comprises an array of vertically disposed collecting plates;
    wherein the clean air delivery rate of the air cleaner can be selected by selection of the number of air cleaning modules comprising the air cleaning element.

18. The air cleaner of claim 17, wherein the vertically disposed collection plates are radially disposed.

19. The air cleaner of claim 18, wherein the at least one air cleaning module comprises an array of vertically disposed ionizing wires.

20. The air cleaner of claim 17, further comprising:
    the housing having an elongated configuration;
    a base for supporting the elongated housing in a vertical orientation; and
    a height of the elongated housing increased in proportion to the number of air cleaning modules.

21. The air cleaner of claim 20, wherein the size of the base is independent of the height of the elongated housing.

* * * * *